(12) United States Patent
Mueller

(10) Patent No.: US 12,264,644 B2
(45) Date of Patent: Apr. 1, 2025

(54) GAS INJECTOR HAVING A SHORT AXIAL DESIGN

(71) Applicant: Robert Bosch GmbH, Stuttgart (DE)

(72) Inventor: Martin Mueller, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/554,974

(22) PCT Filed: Feb. 25, 2022

(86) PCT No.: PCT/EP2022/054745
§ 371 (c)(1),
(2) Date: Nov. 6, 2023

(87) PCT Pub. No.: WO2022/218596
PCT Pub. Date: Oct. 20, 2022

(65) Prior Publication Data
US 2024/0209821 A1 Jun. 27, 2024

(30) Foreign Application Priority Data
Apr. 15, 2021 (DE) .................. 10 2021 203 738.0

(51) Int. Cl.
*F02M 63/00* (2006.01)
*F02M 21/02* (2006.01)

(52) U.S. Cl.
CPC .... *F02M 63/0001* (2013.01); *F02M 21/0254* (2013.01); *F02M 21/0263* (2013.01)

(58) Field of Classification Search
CPC ........... F02M 63/0001; F02M 21/0254; F02M 21/0263

(Continued)

(56) References Cited

U.S. PATENT DOCUMENTS 3,888,273 A * 6/1975 Douglas ............... E21B 43/123
417/115
4,725,002 A * 2/1988 Trachte ................. F02M 61/08
239/533.2

(Continued)

FOREIGN PATENT DOCUMENTS

DE 102008041544 A1 3/2010
DE 102009027528 A1 1/2011

(Continued)

OTHER PUBLICATIONS

International Search Report for PCT/EP2022/054745, Issued Jun. 27, 2022.

*Primary Examiner* — Kurt Philip Liethen
*Assistant Examiner* — John D Bailey
(74) *Attorney, Agent, or Firm* — NORTON ROSE FULBRIGHT US LLP; Gerard A. Messina

(57) ABSTRACT

A gas injector for injecting a gaseous fuel. The gas injector includes: a magnetic actuator having an armature, an inner pole and a coil; a closing element, having a valve needle, the closing element opening and closing a gas path at a sealing seat, the armature being connected to the closing element; a closed off lubricant chamber which is filled with a lubricant and in which the armature is arranged, the lubricant ensuring lubrication of the armature; a flexible sealing element sealing the lubricant chamber with respect to the gas path; a restoring element which resets the closing element to a closed starting position; and a first needle guide formed between a guide sleeve and the valve needle. The first needle guide is arranged in the lubricant chamber radially inside the flexible sealing element, and the restoring element is arranged in the lubricant chamber inside the flexible sealing element.

10 Claims, 1 Drawing Sheet

(58) Field of Classification Search
USPC .... 123/446, 188.9; 239/585.1–585.5, 86–88, 239/95–96, 533.2, 533.9, 533.11, 584, 239/900; 222/402.1, 402.22–402.25, 566
See application file for complete search history.

(56) References Cited

U.S. PATENT DOCUMENTS

| | | | | | |
|---|---|---|---|---|---|
| 4,803,393 | A | * | 2/1989 | Takahashi | H02N 2/043 239/533.1 |
| 4,957,085 | A | * | 9/1990 | Sverdlin | F02M 61/16 123/41.31 |
| 5,421,710 | A | * | 6/1995 | Yorita | F02M 59/14 417/385 |
| 6,073,862 | A | * | 6/2000 | Touchette | F02M 21/0251 239/96 |
| 6,145,761 | A | * | 11/2000 | Muller | F02M 51/0671 239/585.4 |
| 6,155,499 | A | * | 12/2000 | Rembold | F02M 61/168 239/584 |
| 6,168,091 | B1 | * | 1/2001 | Rodier | F02M 57/025 251/48 |
| 6,422,488 | B1 | * | 7/2002 | Fochtman | F02M 51/0664 239/585.5 |
| 6,619,269 | B1 | * | 9/2003 | Stier | F02M 61/20 123/490 |
| 7,040,550 | B2 | * | 5/2006 | Hohl | F02M 61/167 239/533.8 |
| 7,195,182 | B2 | * | 3/2007 | Fischer | F02M 61/08 239/533.1 |
| 7,891,584 | B2 | * | 2/2011 | Ganser | F02M 61/168 239/533.9 |
| 7,934,669 | B2 | * | 5/2011 | Schurz | F02M 61/20 239/533.9 |
| 8,025,488 | B2 | * | 9/2011 | Sellas | F04B 43/107 123/446 |
| 11,384,721 | B1 | * | 7/2022 | Schroeder | F02M 57/023 |
| 2001/0035163 | A1 | * | 11/2001 | Rahardja | F02M 21/0254 123/467 |
| 2002/0023625 | A1 | * | 2/2002 | Sturman | F01L 9/10 123/446 |
| 2003/0047626 | A1 | * | 3/2003 | Maier | F02M 51/0685 239/585.4 |
| 2004/0004139 | A1 | * | 1/2004 | Fischer | F02M 61/08 239/584 |
| 2004/0036048 | A1 | * | 2/2004 | Petersen | F02M 21/0266 251/129.15 |
| 2004/0079815 | A1 | * | 4/2004 | Hohl | F02M 51/0603 239/102.2 |
| 2005/0103587 | A1 | * | 5/2005 | Fischer | F16K 31/007 188/297 |
| 2009/0205614 | A1 | * | 8/2009 | Hlousek | F02M 63/0015 239/585.5 |
| 2011/0042476 | A1 | * | 2/2011 | McAlister | F02M 57/06 239/584 |
| 2012/0160214 | A1 | * | 6/2012 | Salcedo | F02M 51/0603 123/446 |
| 2014/0020773 | A1 | * | 1/2014 | Sommars | F02M 43/04 137/511 |
| 2015/0267659 | A1 | * | 9/2015 | Jaegle | F02M 51/061 239/585.5 |
| 2016/0252027 | A1 | * | 9/2016 | Jackson | F02D 19/0694 60/605.2 |
| 2016/0258400 | A1 | * | 9/2016 | Sjöholm | F02M 21/0266 |
| 2016/0319754 | A1 | * | 11/2016 | Kalenborn | F02D 19/0694 |
| 2017/0022953 | A1 | * | 1/2017 | Tyler | F02M 61/1853 |
| 2017/0101965 | A1 | * | 4/2017 | Grandi | F02M 21/0275 |
| 2017/0101966 | A1 | * | 4/2017 | Filippi | F02M 51/0607 |
| 2019/0017476 | A1 | * | 1/2019 | Kurz | F02M 51/0664 |
| 2020/0240366 | A1 | * | 7/2020 | Schüle | F02M 61/042 |
| 2023/0053845 | A1 | * | 2/2023 | Kremer | F02M 21/023 |
| 2024/0068432 | A1 | * | 2/2024 | Mueller | F02M 51/0675 |

FOREIGN PATENT DOCUMENTS

| | | |
|---|---|---|
| EP | 3059436 A1 | 8/2016 |
| JP | H01313662 A | 12/1989 |
| WO | 2017167558 A1 | 10/2017 |

* cited by examiner

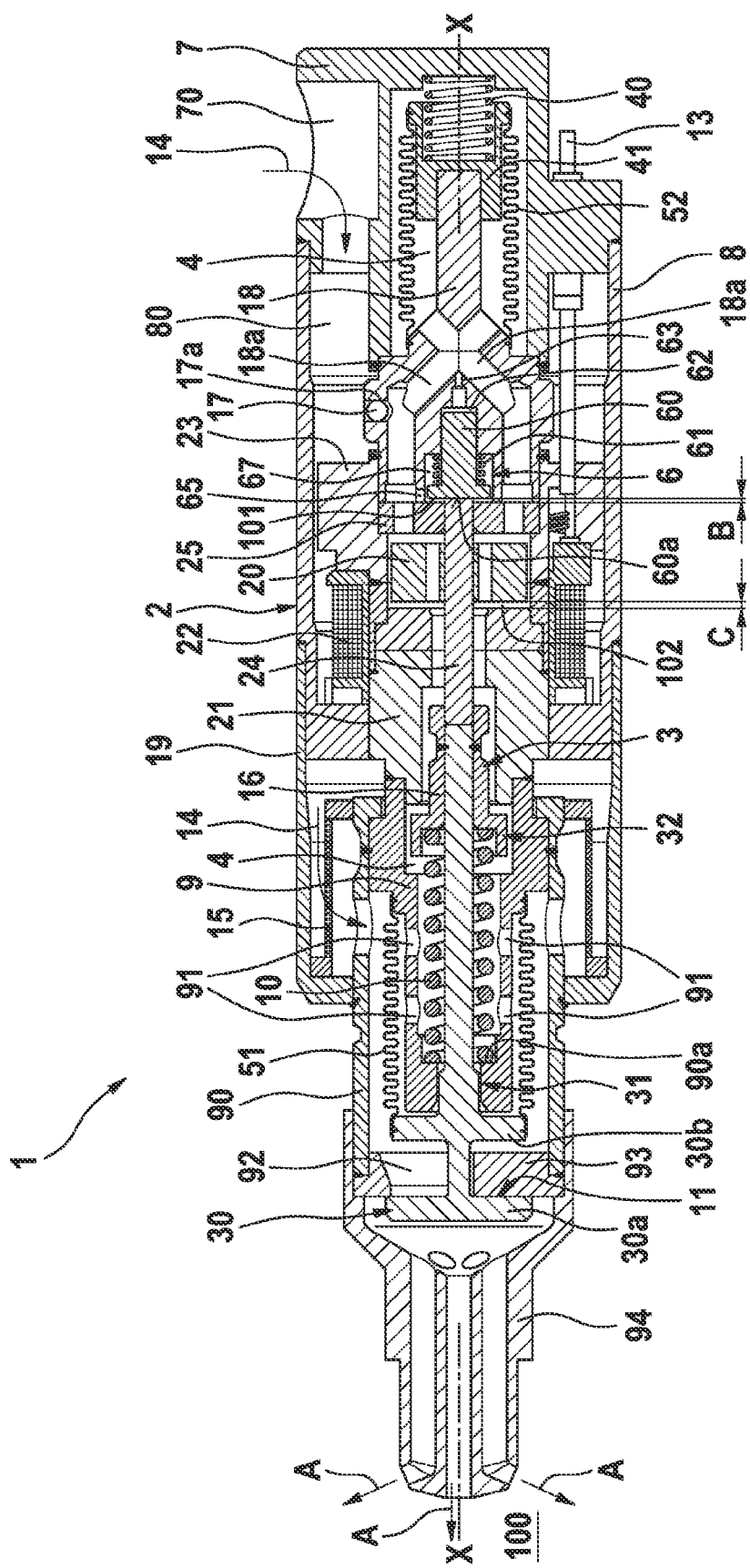

GAS INJECTOR HAVING A SHORT AXIAL DESIGN

FIELD

The present invention relates to a gas injector for injecting a gaseous fuel, in particular hydrogen or natural gas or the like, which has a short axial and compact design. The gas injector is in particular designed for direct injection into a combustion chamber of an internal combustion engine.

BACKGROUND INFORMATION

Gas injectors in the related art are available in a variety of embodiments. One problem with gas injectors is that, because the medium to be injected is gaseous, lubrication by the medium, as is the case with fuel injectors that inject gasoline or diesel, for example, is not possible. This results in excessive wear during operation compared to fuel injectors for liquid fuels. Furthermore, since the size of internal combustion engines is being reduced more and more, a lateral installation rather than a central installation in or near a main axis of a cylinder of the internal combustion engine is often necessary.

SUMMARY

A gas injector according to the present invention for injecting a gaseous fuel may have an advantage that the gas injector has a short axial overall length. The gas injector can be therefore in particular be disposed laterally on a combustion chamber of an internal combustion engine. The gas injector can nonetheless be very slim and in particular provided with a small outer diameter. According to an example embodiment of the present invention, this may be achieved in that the gas injector comprises a magnetic actuator having an armature, an inner pole and a coil. The gas injector further comprises a closing element having a valve needle which opens and closes a gas path for the gaseous fuel at a valve seat. The armature is connected to the closing element. A closed lubricant chamber, which is filled with lubricant and in which the movable armature is disposed, is provided as well. The lubricant ensures lubrication of the armature, so that no wear occurs on the armature during operation. The lubricant chamber here comprises at least one flexible sealing element, in particular a bellows, which seals the lubricant chamber with respect to the gas path and thus ensures the axial mobility of the closing element. The gas injector also comprises a restoring element, in particular a closing spring in the form of a cylinder spring, wherein the restoring element resets the closing element to a closed starting position. A first needle guide is furthermore formed between a guide sleeve and the valve needle of the closing element. The first needle guide is disposed in the lubricant chamber inside the flexible sealing element and the restoring element is likewise disposed at least partly in the lubricant chamber inside the flexible sealing element. The restoring element is preferably disposed completely inside the flexible sealing element. The flexible sealing element, the first needle guide and the restoring element are disposed inside one another. This makes it possible to save axial installation space and reduce an overall axial length of the gas injector. The lubricant chamber also provides a long service life for the magnetic actuator, because very little wear occurs, in particular on the needle guide and the armature, as well as on components that can be brought into contact with the armature. Preferred further developments and example embodiments of the present invention are disclosed herein.

According to an example embodiment of the present invention, the flexible sealing element is preferably a metal bellows. On the one hand, the metal bellows provides very good mobility to enable the axial movements of the closing element and, on the other hand, the metal bellows can thus be disposed as close to the hot combustion chamber of the internal combustion engine as possible. This makes it possible to further reduce an overall axial length of the gas injector. Alternatively, the flexible sealing element is a plastic bellows or a membrane or a rubber element.

The flexible sealing element is particularly preferably fastened directly to the valve needle and directly to the guide sleeve.

According to an example embodiment of the present invention, for particularly simple fixing of the flexible sealing element to the valve needle, the valve needle preferably comprises a fixing disc. The fixing disc can be formed in one piece with the valve needle or can alternatively be provided as an annular disc, which is connected to the valve needle by means of a weld connection, for example.

According to another preferred configuration of the present invention, a second needle guide is formed between the valve needle and the guide sleeve. Starting from the sealing seat of the closing element, the second needle guide is further away from the sealing seat than the first needle guide. The second needle guide is preferably likewise disposed inside the flexible sealing element.

According to an example embodiment of the present invention, in order to achieve an even more compact design, the restoring element is preferably disposed entirely in the guide sleeve. The restoring element is particularly preferably a cylinder spring that fits snugly against the valve needle. The guide sleeve particularly preferably comprises a shoulder on which the restoring element is supported at one end. The other end is further preferably supported on a spring holder.

The guide sleeve preferably comprises an inner shoulder on which the restoring element is supported at one end.

According to another preferred configuration of the present invention, the gas injector comprises a gas inlet which is disposed laterally on the gas injector. The gas inlet is preferably disposed laterally on a main body of the gas injector. This makes it possible to further reduce an axial overall length of the gas injector and make the gas injector even more compact. The lateral gas inlet is preferably provided at a 90° angle to a longitudinal axis of the gas injector.

According to an example embodiment of the present invention, the gas injector further preferably has a flat sealing seat. At an end facing toward the combustion chamber, the closing element preferably comprises a sealing disc, which unblocks one or more through-openings at a valve seat. The gas injector is preferably configured as an outward-opening injector. This makes it possible to provide a sealing seat which lies in a plane perpendicular to the longitudinal direction of the gas injector.

According to an example embodiment of the present invention, the gas injector furthermore preferably comprises a braking device, which is disposed in the lubricant chamber and is configured to slow the closing element during a resetting operation of the gas injector from the open to the closed state. The braking device comprises a brake bolt, a damping chamber which is in fluid communication with the lubricant chamber, and an elastic brake element, in particular a spring. During the resetting operation, the brake bolt and the elastic brake element are in operative connection with the closing element and/or the armature, wherein the brake bolt is further configured to force lubricant out of the damping chamber during the resetting operation in order to damp a resetting of the brake bolt. Since a portion of the braking process is provided by hydraulic adhesion between the brake bolt and a stop component against which the brake bolt rests when the gas injector is open, providing the damping chamber can prevent the formation of vapor bubbles in the liquid lubricant when overcoming the hydraulic adhesion, so that wear caused in particular by cavitation can be prevented.

The braking process is further supported by the acceleration of the additional masses provided by the braking device. Further braking is moreover achieved via the displacement of the lubricant between the armature and the brake bolt. A resetting speed of the closing element can also be further reduced by friction between guide elements or the like and the brake bolt. This all reduces the impact force of the armature at the stop, so that a service life of the armature can be further extended as well.

According to an example embodiment of the present invention, the brake bolt further preferably in particular comprises a main body with a contact surface, which is disposed on a side of the main body of the brake bolt facing the closing element and can be brought into operative connection with the closing element and serves as a stop surface. The main body is preferably cylindrical. Further preferably, an annular flange is disposed on the side of the main body facing the closing element. The annular flange preferably serves as a stop surface.

According to another preferred configuration of the present invention, the elastic brake element of the braking device is disposed in the damping chamber. This makes it possible to realize a particularly compact design. The elastic brake element is preferably a compression spring, in particular a cylinder spring.

According to an example embodiment of the present invention, the damping chamber is further preferably in fluid communication with the lubricant chamber via a guidance play of the brake bolt.

According to an example embodiment of the present invention, the gas injector preferably further comprises a throttle which connects the damping chamber to the lubricant chamber. The throttle ensures that the damping process can take place in a defined manner because the lubricant is then moved out of the damping chamber via the throttle into the lubricant chamber. The throttle is preferably a small connecting bore between the damping chamber and the lubricant chamber. The damping behavior of the braking device can be set by selecting the geometric dimensions of the connecting bore, for example the diameter and/or the length of the bore.

According to an example embodiment of the present invention, the gas injector further preferably comprises an armature bolt which rests against the closing element, wherein the armature bolt is connected to the armature. An end of the armature bolt facing away from a sealing seat of the gas injector is configured to come into contact with the brake bolt when the gas injector is closed.

According to an example embodiment of the present invention, the gas injector preferably also comprises an armature bolt guide in which the armature bolt is guided. The armature bolt guide forms a stop for the brake bolt when the gas injector is open. When closed, there is a first gap between the armature bolt guide and the brake bolt. When opening, this first gap is overcome by the compressive force of the spring of the braking device which acts on the brake bolt.

According to another preferred configuration of the present invention, the gas injector comprises a guide body, which is disposed in the lubricant chamber and comprises a guide region for guiding the brake bolt. The guide body preferably comprises a recess, in particular at an end of the guide body which faces the sealing seat, in which the brake bolt is guided.

When the gas injector is closed, the first gap between the brake bolt and the armature bolt guide preferably has a first width B, which is smaller than a second gap having a second width C between the armature and the inner pole. The axial gap B between the armature bolt guide and the brake bolt is preferably in a range of 1% to 90% of the axial gap C between the armature and the inner pole. The axial gap B between the armature bolt guide and the brake bolt is particularly preferably less than 25% of the axial gap C, further preferably in a range of 3% to 20% of the axial gap C. The axial gap C preferably has a size of 0.05 mm to 3 mm, in particular 0.8 mm.

According to an example embodiment of the present invention, the flexible sealing element of the lubricant chamber preferably comprises a first and a second flexible sealing element. The lubricant chamber is therefore sealed by two flexible sealing elements, which, when the lubricant is displaced in the lubricant chamber, can prevent the creation of unfavorable overpressure or underpressure that can exert an unwanted force on the closing element of the gas injector, for example via components of the lubricant reservoir. Even if an unfavorable force is exerted on one of the sealing elements, which could lead to a pressure increase in the closed lubricant chamber, the provision of two flexible sealing elements makes it possible to provide compensation with the second flexible sealing element. An undesirable pressure change inside the closed lubricant chamber can thus be successfully prevented.

According to an example embodiment of the present invention, an accumulator spring further preferably exerts a predetermined force on the lubricant in the closed lubricant chamber from the outside. Preferably, an overpressure of between 0.5 and $10 \times 10^5$ Pa is exerted, particularly preferably 1 to $5 \times 10^5$ Pa. The lubricant in the lubricant chamber can thus be brought under a predetermined preload, as a result of which undesirable deformations that could have an effect on a stroke of the closing element can be reliably prevented.

According to an example embodiment of the present invention, the first flexible sealing element is particularly preferably a first bellows and the second flexible sealing element is a second bellows. The first and second bellows are further preferably configured identically, i.e. have a same average bellows diameter and the same number of bellows convolutions. This allows in particular the manufacturing costs of the gas injector to be reduced.

The second bellows is further preferably connected to the accumulator spring via a spring plate. This enables a simple and cost-efficient design. This also makes it possible to exert a certain preload directly on the second bellows by means of the accumulator spring, which slightly increases a stiffness of the second bellows relative to the first bellows.

Alternatively, the first and second flexible sealing element is a respective membrane or a respective rubber element. The membrane can be single-layered or multilayered and can be fixed, for example by laser welding, to the respective components to seal the lubricant chamber.

According to an example embodiment of the present invention, an oil, in particular mineral oil, is preferably used as the lubricant. Alternatively, a liquid fuel, in particular diesel or gasoline, is used. Further alternatively, a grease is used as the lubricant.

BRIEF DESCRIPTION OF THE DRAWING

An embodiment example of the present invention is described in detail in the following with reference to the FIGURE.

FIG. 1 shows a schematic sectional view of a gas injector according to a first embodiment example of the present invention.

DETAILED DESCRIPTION OF EXAMPLE EMBODIMENTS

A gas injector 1 according to a first preferred embodiment example of the present invention is described in detail in the following with reference to FIG. 1.

As can be seen from FIG. 1, the gas injector 1 for introducing a gaseous fuel comprises a magnetic actuator 2, which moves an outward-opening closing element 3 from a closed state to an open state. FIG. 1 shows the closed state of the gas injector.

The magnetic actuator 2 comprises an armature 20, which is connected to the closing element 3 by means of an armature bolt 24. The magnetic actuator 2 further comprises an inner pole 21, a coil 22 and a magnet housing 23, which ensures a magnetic return of the magnetic actuator.

The gas injector 1 moreover comprises a main body 7 having a lateral gas inlet 70 through which the gaseous fuel is supplied. A valve housing 8, in which the magnetic actuator 2 is disposed, is fixed to the main body 7. The valve housing 8 is adjoined by a housing sleeve 19 and a valve tube 90, at the free end of which on a valve seat component 93 a sealing seat 11 is provided, at which the closing element 3 opens and closes a passage for the gaseous fuel.

FIG. 1 schematically shows an electrical connector 13, which is guided through the main body 7 and the magnet housing 8 to the magnetic actuator 2.

The reference sign 10 identifies a restoring element for the closing element 3, which resets said closing element to the closed state shown in FIG. 1 after an opening process.

FIG. 1 also shows a gas flow as a gas path 14 through the gas injector 1. The gas flow starts at the gas inlet 70 and is then redirected into an annular space 80 between the valve housing 8 and the main body 7. The gas flow 14 continues past an outer region of the magnetic actuator 2, through a filter 15 to the sealing seat 11. Openings are accordingly provided in the respective components, which are not all shown in FIG. 1.

When the gas injector 1 is opened, the gaseous fuel then flows past the outer periphery of the magnetic actuator 2 and the opened sealing seat 11 into a nozzle attachment 94 and into a combustion chamber 100 of an internal combustion engine as indicated in FIG. 1 by the arrows A.

The closing element 3 comprises a valve needle 30 with a seat plate 30a, which is disposed on the end of the closing element which faces the combustion chamber. The sealing seat 11 is configured between the seat plate 30a and the valve seat component 93, which comprises a plurality of axial openings 92.

A fixing disc 30b is further provided on the closing element 3 and is disposed at a slight distance from the seat plate 30a in the direction of the magnetic actuator 2.

The closing element 3 thus opens and closes the gas path 14 at the sealing seat 11. To guide the closing element, a first needle guide 31 and a second needle guide 32 are provided between the closing element 3 and a guide sleeve 9 as can be seen in detail in FIG. 1. The first needle guide 31 is formed directly between the closing element 3 and the guide sleeve 9. The second needle guide 32 is formed between a spring plate 16 and the guide sleeve 9. The spring plate 16 is fixedly connected to the closing element 3, wherein the restoring element 10 is supported between an inner shoulder 90a of the guide sleeve 9 and the spring plate 16.

The gas injector 1 further comprises a closed lubricant chamber 4. The closed lubricant chamber 4 is completely or partially filled with a liquid lubricant, e.g., oil.

As can be seen from FIG. 1, the lubricant chamber 4 is defined by a first flexible sealing element 51, the inner pole 21, the magnet housing 23, a guide body 18 and a second flexible sealing element 52. The first and the second flexible sealing element 51, 52 is respectively configured as a bellows. The first and second flexible sealing elements 51, 52 are configured in the same way.

It should be noted that a membrane or a hose or the like can also be as the flexible sealing elements 51, 52 instead of a bellows.

As can further be seen from FIG. 1, the second flexible sealing element 52 is fixed to an accumulator spring plate 41, for example by means of a weld connection. The gas injector 1 also comprises an accumulator compression spring 40, which is supported on the main body 7 and preloads the second flexible sealing element 52 via the accumulator spring plate 41. Connecting bores 18a are provided in the guide body 18, so that the lubricant located in the lubricant chamber 4 is also located in the region inside the second flexible sealing element 52.

The first flexible sealing element 51 is fixed directly to the closing element 3 on the fixing disc 30b and connected at the other end to the guide sleeve 9. Transverse bores 91 are provided in the guide sleeve 9, so that there is a fluid connection between the interior space of the first flexible sealing element 51 and the interior space of the guide sleeve 9.

The lubricant chamber 4 thus comprises two flexible sealing elements 51, 52 and the accumulator compression spring 40. The accumulator compression spring 40 exerts a certain preload, for example $1 \times 10^5$ Pa, on the lubricant in the lubricant chamber 4. If a displacement of the lubricant caused by the stroke of the closing element 3 or also by thermal expansion or cooling of the lubricant now occurs during an opening process, any possibly arising overpressure/underpressure inside the lubricant chamber 4 can be compensated by deflection on the second flexible sealing element 52 in conjunction with a contraction of the accumulator compression spring 40. Thus, the flexible sealing element 51 cannot exert a force which is unwanted and acts on the closing element 3 via the effective surface of the bellows.

The armature bolt 24 with the affixed armature 20 is likewise disposed in the closed lubricant chamber 4. Since the lubricant chamber 4 is filled with a lubricant, for example a liquid fuel, such as gasoline or diesel, or a grease or the like, continuous lubrication of the armature 20 is provided. The prior art problem with gaseous fuels that there is a lack of lubrication of the moving parts can thus be compensated.

As can be seen from FIG. 1, a filling channel 17a is provided for filling the closed lubricant chamber 4. The filling channel 17a is closed in a fluid-tight manner by means of a sealing ball 17.

As can further be seen from FIG. 1, the first needle guide 31, which is formed between the guide sleeve 9 and the valve needle 30, is now disposed inside the first flexible sealing element 51. A part of the restoring element 10 is moreover disposed inside the first flexible sealing element 51 as well. A part of the guide sleeve 9 is also disposed inside the first flexible sealing element 51. According to the present invention, there is therefore an arrangement of the restoring element 10, the guide sleeve 9 and the first flexible sealing element 51 one inside the other. This makes it possible to significantly reduce an axial overall length of the gas injector 1.

Despite the nested arrangement of the valve needle 30, the restoring element 10, the guide sleeve 9 and the first flexible sealing element 51, an outer diameter, in particular in the region of the valve tube 90, is not increased.

The accumulator compression spring 40 and the accumulator spring plate 41 are moreover disposed at least partly in the second flexible sealing element 52 as well. A region of the guide body 18 is also disposed inside the second flexible sealing element 52. This further reduces an axial overall length of the gas injector 1.

It should be noted that the nozzle attachment 94 can also be omitted if necessitated by the installation space conditions. The gaseous fuel is furthermore supplied from the side through the lateral gas inlet 70, and not in axial direction as has been customary to date for gas injectors. This further reduces the overall length of the gas injector, in particular in the region of the gas injector facing away from the combustion chamber.

A braking device 6 is furthermore disposed in the closed lubricant chamber 4. The braking device 6 includes a brake bolt 60, a brake spring 61 and a damping chamber 62. The damping chamber 62 is in fluid communication with the lubricant chamber 4.

During a resetting operation of the gas injector into the closed starting position, the brake bolt 60 and the elastic brake element 61 are in operative connection with the closing element 3. During the resetting operation, lubricant is forced out of the damping chamber 62 into the lubricant chamber 4 in order to achieve additional damping when the brake bolt 60 is reset into the closed state of the gas injector (FIG. 1). The brake bolt 60 is guided in the guide body 18.

As can further be seen from FIG. 1, the damping chamber 62 is configured directly on the brake bolt 60 on a side of the brake bolt 60 facing away from the valve seat 11. The damping chamber 62 is connected to the connecting bores 18a, and thus to the main part of the lubricant chamber 4, via a throttle 63 which is a small bore. The brake spring 61 is disposed in a spring chamber 67.

The brake bolt 60 has an abutment surface 60a which is in contact with the armature bolt 24. In the closed state, which is shown in FIG. 1, there is a first gap 101 between the brake bolt 60 and a stationary armature bolt guide 25. The armature bolt guide 25 guides the armature bolt 24 during an opening and closing process.

As can further be seen from FIG. 1, the brake spring 61 is disposed between the brake bolt 60 and the guide body 18. The brake bolt 60 comprises a flange, which is provided with clearance to the guide body 18. A passage 65, which can be configured as a slot on the end of the guide body 18 facing the armature bolt guide 25, for instance, is furthermore provided in the guide body 18. A fluid connection for the lubricant from the spring chamber 67 to the lubricant chamber 4 via the guidance play and the passage 65 can be thus be provided.

In the closed state, there is still the first gap 101 between the abutment surface 60a of the brake bolt 60 and the armature bolt guide 25. The gap 101 has a first width B, which is smaller than a second width C between the armature 20 and the inner pole 21 (see FIG. 1) at a second gap 102. This ensures that a stroke of brake bolt 60, which is preloaded in axial direction by the compression spring 61, is smaller than a stroke of armature 20. This allows sufficient fluid to flow from the lubricant chamber 4 via the throttle 63 into the damping chamber 62 during the injection process.

During the closing process, the armature bolt 24 hits the abutment surface 60a of the brake bolt 60. The brake bolt 60 is consequently pressed against the fluid in the damping chamber 62. Because of the throttle 63, the fluid cannot be forced out of the damping chamber 62 immediately, but is instead pushed out slowly, so that a damping effect during the closing process is enabled. This prevents excessive wear on the sealing seat 11 and the armature 20, since the closing process is damped by the resetting of the brake bolt 60.

The damping process is further supported by the brake spring 61 and a hydraulic adhesion of the brake bolt 60 on the armature bolt guide 25. The damping chamber 62 makes it possible to prevent cavitation in this region between the armature bolt guide 25 and the abutment surface 60a of the brake bolt 60 during the closing process. Friction of the brake bolt 60 in the guide body 18 also slows the resetting operation as well as the masses to be accelerated of the moving components in the lubricant chamber 4 as a whole, which lead to a displacement of the lubricant in the closed lubricant chamber 4 and thus to additional braking during the closing process.

The damping behavior can be set individually for the respective gas injector by selecting a diameter and/or a length of the throttle 63.

It should be noted that a stop surface between the brake bolt 60 and the armature bolt guide 25 can preferably be wedge-shaped, i.e. not at right angles to a center axis X-X of the gas injector. Radial slots can alternatively or additionally be provided in the abutment surface 60a or the end face of the armature bolt guide 25 that faces the brake bolt 60, which further reduces and prevents a cavitation effect.

The gas injector 1 shown in FIG. 1 is thus balanced in terms of compressive force. In other words, the closing element 3 is connected to the guide sleeve 9 via the first flexible sealing element 51, wherein the first flexible sealing element 51, which is configured as a metal bellows, has an average diameter which is equal to a diameter at the sealing seat 11 on which the closing element 3 seals. There is therefore no compressive force on the closing element 3, so that a magnetic force, which is necessary for opening the closing element 3, can be kept very small and is in particular independent of a pressure of the gaseous fuel.

With the present invention, therefore, when the closing element 3 has been placed in the open state by actuation of the magnetic actuator 2 (movement of the closing element 3 in FIG. 1 to the left) and a gas injection is carried out, reliable damping can be carried out when the closing element 3 is reset shortly before the closing element is pressed into the valve seat 11. The brake bolt 60 is pressed in the direction of the damping chamber 62 by the armature bolt 24 and moves only as slowly as the lubricant is being pushed out of the damping chamber 62 through the throttle 63 into the lubricant chamber 4. A closing speed of the closing element 3 is therefore slowed significantly and effectively before the closing element hits the valve seat 11. Thus, wear on the valve seat 11 and the closing element 3 can effectively be reduced, while the braking device 6 continues to enable the gas injector to operate more quietly. This also makes it possible to effectively prevent a so-called closing bounce, in which an element hits a valve seat hard and is bounced back.

The sealing seat 11 is configured as a flat sealing seat, so that the sealing surfaces on the seat plate 30a and the valve seat component 91 can be easily produced, for example by a surface processing such as lapping.

The gas injector 1 can thus provide reduced wear on the moving parts, in particular on the valve seat 11, the armature 20 and in the armature bolt 24. The closed lubricant chamber 4 with a liquid lubricant furthermore makes it possible to significantly improve heat dissipation from the magnetic actuator 2. The two flexible sealing elements 51, 52 can furthermore prevent unwanted forces from acting on the closing element 3.

The gas injector 1 can still have a significantly reduced axial length, so that in particular lateral mounting on a combustion chamber 100 of an internal combustion engine is possible. Since, a lateral gas inlet 70 is also provided in addition to the nested arrangement of components of the gas injector, the axial overall length of the gas injector 1 is significantly reduced.

The invention claimed is:

1. A gas injector for injecting a gaseous fuel, comprising:
   a magnetic actuator including an armature, an inner pole, and a coil;
   a closing element including a valve needle, wherein the closing element opens and closes a gas path at a sealing seat, wherein the armature is connected to the closing element;
   a closed lubricant chamber filled with a lubricant and in which the armature is disposed, wherein the lubricant lubricates the armature;
   a flexible sealing element which seals the lubricant chamber with respect to the gas path;
   a restoring element which resets the closing element to a closed starting position;
   a first needle guide which is formed between a guide sleeve and the valve needle; and
   a braking device configured to slow the closing element during a resetting operation of the gas injector from an open state to a closed state is disposed in the lubricant chamber;
   wherein the first needle guide is disposed in the lubricant chamber radially inside the flexible sealing element; and
   wherein the restoring element is disposed in the lubricant chamber at least partly, inside the flexible sealing element.

2. The gas injector according to claim 1, wherein the flexible sealing element is a metal bellows or a plastic bellows or a membrane or a rubber element.

3. The gas injector according to claim 1, wherein the flexible sealing element is fastened directly to the valve needle and directly to the guide sleeve.

4. The gas injector according to claim 1, further comprising a second needle guide which is formed in the lubricant chamber between the valve needle and the guide sleeve.

5. The gas injector according to claim 1, wherein the restoring element is disposed entirely in the guide sleeve.

6. The gas injector according to claim 1, wherein the guide sleeve includes an inward-facing shoulder for supporting the restoring element.

7. The gas injector according to claim 1, further comprising a gas inlet which is disposed laterally on the gas injector at a 90° angle to a longitudinal axis of the gas injector.

8. The gas injector according to claim 1, wherein the sealing seat is a flat sealing seat.

9. A gas injector for injecting a gaseous fuel, comprising:
   a magnetic actuator including an armature, an inner pole, and a coil;
   a closing element including a valve needle, wherein the closing element opens and closes a gas path at a sealing seat, wherein the armature is connected to the closing element;
   a closed lubricant chamber filled with a lubricant and in which the armature is disposed, wherein the lubricant lubricates the armature;
   a flexible sealing element which seals the lubricant chamber with respect to the gas path;
   a restoring element which resets the closing element to a closed starting position;
   a first needle guide which is formed between a guide sleeve and the valve needle;
   wherein the first needle guide is disposed in the lubricant chamber radially inside the flexible sealing element;
   wherein the restoring element is disposed in the lubricant chamber at least partly, inside the flexible sealing element;
   wherein the flexible sealing element is fastened directly to the valve needle and directly to the guide sleeve; and
   wherein the valve needle further includes a fixing disc, wherein the flexible sealing element is fastened to the fixing disc.

10. A gas injector according to claim 1, for injecting a gaseous fuel, comprising:
    a magnetic actuator including an armature, an inner pole, and a coil;
    a closing element including a valve needle, wherein the closing element opens and closes a gas path at a sealing seat, wherein the armature is connected to the closing element;
    a closed lubricant chamber filled with a lubricant and in which the armature is disposed, wherein the lubricant lubricates the armature;
    a flexible sealing element which seals the lubricant chamber with respect to the gas path;
    a restoring element which resets the closing element to a closed starting position;
    a first needle guide which is formed between a guide sleeve and the valve needle;
    wherein the first needle guide is disposed in the lubricant chamber radially inside the flexible sealing element;
    wherein the restoring element is disposed in the lubricant chamber at least partly, inside the flexible sealing element; and
    a braking device configured to slow the closing element during a resetting operation of the gas injector from an open state to a closed state is disposed in the lubricant chamber, the braking device including a brake bolt, a damping chamber which is filled with lubricant and is in fluid communication with the lubricant chamber, and an elastic brake element, wherein the brake bolt and the elastic brake element can be brought into operative connection with the closing element during the resetting operation of the gas injector and the brake bolt is configured to force lubricant out of the damping chamber into the lubricant chamber during the resetting operation of the gas injector to damp a resetting of the brake bolt into a closed state.

* * * * *